3,161,469
PREPARATION OF BORON HYDRIDES
Eugene C. Ashby and Harold E. Podall, Baton Rouge, La., assignors to Ethyl Corporation, New York, N.Y., a corporation of Virginia
No Drawing. Filed July 16, 1958, Ser. No. 748,813
7 Claims. (Cl. 23—204)

The present invention relates to the preparation of hydrides of boron, particularly diborane.

It has been known to produce diborane by the hydrolysis of magnesium boride, reaction of a boron halide and hydrogen in a glow discharge under vacuum, reaction of a metal hydride such as lithium hydride with boron trifluoride, and the reaction of an alkali metal borohydride with a boron halide. These procedures suffer particular disadvantages. For example deriving diborane from magnesium boride results in low yields, the lithium hydride process is objectionable because of the high cost of lithium and because the reaction is prone to sudden surges of gas unless a heel of a previous reaction mixture is maintained, and the borohydride process, although more efficient than the above processes, suffers disadvantage in that the borohydride is costly and a part of the boron is utilized in the formation of undesired by-products, e.g., haloboron hydrides.

Another process which is reported is the reaction of a boron halide with certain metals, including aluminum, and hydrogen, note U.S. Patent 2,469,879. This procedure has not been employed upon a commercial scale and likewise suffers particular disadvantages. For example although diborane is produced there is no selectivity to result in the principal formation of this compound. That is, it is prepared in admixture with haloboron hydrides. Although some of the latter compounds will decompose to result in diborane, boron trihalide also results so that a considerable proportion of the boron added for reaction is not consumed in forming the desired product. Likewise, in addition to the formation of diborane a great amount of higher boron hydrides, e.g., tetraborane, pentaborane and the like are also formed. Although these latter products are of some utility, their separation into the respective individual boron hydride fractions is not readily achieved. A still further disadvantage of the process is that it is a vapor phase reaction requiring high temperatures and the yield of diborane obtained is low. Generally speaking, the process results in a 50 percent yield of all of the aforementioned and other products. Of this yield only about ⅕ constitutes diborane. Likewise, as is the case in the lithium hydride and borohydride processes, the costly boron halide is employed and the halogen is wasted.

Accordingly, it is desirable to provide an improved process for the preparation of boron hydrides, especially diborane, which are useful as reducing materials for reaction with olefins to produce the organoboron compounds or, in particular, high energy fuel applications.

An object of this invention is to provide a new and improved process for the preparation of boron hydrides. A particular object is to provide a process for the preparation of diborane in higher yield than heretofore obtainable. A still further object is to provide boron hydride amine complexes in high yield. These and other objects will be evident as the discussion proceeds.

The above and other objects are accomplished by the reaction of an organic ester of boric acid with aluminum and hydrogen. The organic esters of boric acid are preferably those wherein the organic groups are aryl, especially phenyl. In general, the temperature employed is between about 120 to 300° C. Particular advantage can be achieved when the reaction is conducted in the presence of organic diluents. In this embodiment, tertiary amines are quite suitable even though they result in the formation of a boron hydride-amine complex. For most efficient results when conducting the reaction in the absence of tertiary amines, temperatures between 140 to 180° C. and a pressure greater than 1000 pounds per square inch (p.s.i.) are employed. Thus, one preferred embodiment of this invention comprises the reaction of triphenyl borate with aluminum and hydrogen at 140 to 180° C. at a pressure greater than 1000 p.s.i. Conducting the reaction in the presence of a tertiary amine permits reaction at higher preferred temperatures. Consequently, in another especially preferred embodiment the reaction of triphenyl borate with aluminum and hydrogen is conducted in the presence of a tertiary amine, especially triethylamine, at a temperature between about 200 to 250° C. and a pressure greater than 1000 p.s.i.

The present process is of particular advantage in that a more selective production of boron hydrides is obtained. In particular, diborane in the free state or when complexed with a tertiary amine, is essentially the only product obtained. The process consistently results in yields of diborane greater than about 60 percent and usually greater than 80 percent. Additionally essentially no formation of alkoxy boron hydrides is obtained and the formation of higher boron hydrides is essentially eliminated. Further a simplified recovery of the diborane is provided and utilization of the by-product aluminum alcoholate is effected for readily producing the starting organic ester of boron as will be brought forth in more detail hereinafter. Other advantages will be evident as the discussion proceeds.

The boron compound employed in the process is an organic ester of boric acid. Such compounds are also termed boron alcoholates. They can be depicted generally by the formula

wherein X, Y, and Z are —OR groups which can be the same or different and wherein the R groups are aliphatic or aromatic, preferably hydrocarbon, having up to and including about 20 carbon atoms. Included among such compounds are, for example, trimethyl borate, triethyl borate, trihexyl borate, trioctyl borate, trioctadecyl borate, trieicosyl borate, trivinyl borate, tricyclohexyl borate, tricyclopentyl borate, tricyclohexenyl borate, triphenyl borate, tribenzyl borate, tritolyl borate, trinaphthyl borate, ethyl dimethyl borate, tri (p-chlorophenyl) borate and the like. The hydrocarbon portion of the aforementioned radicals can be further substituted provided such substituents are essentially inert in the reaction. It is preferred, however, that the R groups be alkyl or aryl having up to and including about 8 carbon atoms. Since such are more reactive and produce highest yields of diborane, electron draining groups are preferable R groups of which the aryl radicals are especially preferred including those which are negatively substituted, as for example, with a halogen. In order to achieve best results a further criteria of the boron alcoholate is that it is preferably liquid or soluble in the reaction system. Such compounds which additionally result in the formation of an aluminum by-product which is likewise liquid or soluble in the reaction system are also especially preferred in order to minimize coating of the aluminum metal reactant and thereby diminish reaction.

The aluminum metal employed can be in any form, that is as a bar, rod or even alloyed with other metals. Since it is solid in the system, it is preferred to employ the aluminum in a finely divided state of major dimension of about ¼ inch as for example aluminum dust, shavings, or powder. Such forms of aluminum are readily obtained by mechanical means such as grinding, or by chemical means in the preparation of the metal by reduction from its ore. It is preferred to employ finely divided aluminum which has been activated by some means, e.g., recycling excess aluminum from a previous reaction, treating the aluminum with triethylaluminum and hydrogen at 140° C. and 1000 p.s.i. and filtering, or shaving aluminum under an inert diluent.

It is not necessary that the hydrogen employed be pure and, in general, commercially available sources of hydrogen are applicable. However, contaminants which are reactive in the system should be kept to a minimum.

In general, the operational techniques employed in conducting the process involve merely the addition of the boron alcoholate and aluminum metal to a reactor, then contacting with hydrogen, usually under pressure, and the reaction system is agitated. If desired, diluents can be employed to facilitate fluidity of the reaction mixture and provide better contact between the reactants. The diborane formed is recovered from the system and collected, by passing the vent gas through liquid air traps or by scrubbing through a tertiary amine and isolating the product as a boron hydride-amine complex, or in those instances wherein a tertiary amine is employed as a diluent during reaction the boron hydride-amine complex is readily distilled from the system after removal of excess amine solvent. The by-product aluminum alcoholate can be, if desired, recovered and then hydrolyzed to form the alcohol which is then reacted with boric acid, boric oxide, or borax and sulfuric acid to produce additional boron alcoholate starting material.

The invention will be further understood by reference to the following examples wherein all parts are by weight.

Example I

To a reactor equipped with internal agitation, external heating means, a means for admitting and discharging reactants and maintaining a gaseous pressure was added 90 parts of triethylamine. Then 15 parts of triphenyl borate were added thereto along with 7 parts of finely divided aluminum activated by treating with triethylaluminum and hydrogen at 140° C. and 1000 p.s.i. and filtering. The reactor was then heated to 220° C. and pressurized to 5000 p.s.i. with hydrogen. Vigorous agitation was commenced and these conditions were maintained for a period of 4½ hours during which time a pressure drop of 400 p.s.i. was noted. At the end of this period the reaction mixture was filtered and the filtrate subjected to vacuum distillation at room temperature and 5 millimeters of mercury to remove excess triethyl amine which was recovered. The residue remaining was 5 parts of boron hydride-triethylamine complex representing a yield of 80 percent.

Example II

Employing the procedure of Example I but without a solvent, 80 parts of methyl borate were added to 10 parts of finely divided activated aluminum with the reaction temperature at 300° C. and pressure at 5000 p.s.i. for 4½ hours. A pressure drop of 200 p.s.i. was obtained indicating the formation of boron hydrides.

Example III

Employing the procedure of Example I, 30 parts of triethylborate are reacted with 10 parts of aluminum suspended in 80 parts of benzene at 140° C. and with 1000 p.s.i.g. pressure of hydrogen for 5 hours. Diborane gas is formed during the reaction and is recovered by scrubbing the vent gas in triethyl amine scrubbers.

Good results are obtained when tri-(t-butyl)borate is substituted for the triethyl borate in this example.

Example IV

Diborane is produced in high yield when 30 parts of tricyclohexylborate are reacted with 7 parts of aluminum at 180° C. suspended in the dimethyl ether of diethylene glycol at a hydrogen pressure of 3000 p.s.i. for 3 hours.

Example V

When tribenzyl borate is reacted with finely divided aluminum suspended in toluene at 120° C. and under a hydrogen pressure of 5000 p.s.i.g. for 10 hours, diborane is obtained in high yield.

Example VI

Example I is repeated substituting tri(p-chloro-phenyl) borate for triphenyl borate with a reaction time of 1 hour. Boron hydride-triethyl amine complex is obtained in high yield.

Example VII

When Example I is repeated substituting trimethylamine, pyridine, methylaniline or triphenyl amine for triethylamine, boron hydride-trimethylamine, boron hydride pyridine, boron hydride-methylaniline, and boron hydride-triphenyl amine complexes respectively are obtained by fractional distillation from the reaction mixture.

Example VIII

Twenty-five parts of phenyl borate were added to 100 parts of tetrahydrofuran and 10 parts of aluminum powder. The slurry was heated to 150° C. and 5000 p.s.i. of hydrogen for 20 hours with agitation. Diborane was recovered in high yield.

When solvents are employed it is not necessary that they be pure. Some advantage is achieved when a mixture of two different solvents are used, as for example a mixture of an ether and a tertiary amine. The following example will demonstrate this embodiment.

Example IX

Employing the reactor of Example I, 28.4 parts of phenyl borate were added to 100 parts of tetrahydrofuran and 11 parts of triethylamine along with 10 parts of activated aluminum metal. The mixture was heated to 250° C. and a 5000 p.s.i. pressure of hydrogen was maintained for a period of 6 hours. A 600 p.s.i. pressure drop was obtained. Employing the mixture of tetrahydrofuran and triethylamine results in the by-product aluminum triphenylate being dissolved in the reaction mixture. Upon subjecting the reaction mixture to distillation to remove the excess triethylamine and tetrahydrofuran, the aluminum phenylate precipitates and is separated by filtration. The residue is distilled to obtain boron hydride-triethylamine in high yield.

The above examples are presented by way of illustration and it is not intended that the invention be limited thereto. It will be evident that other borates and solvents can be substituted if desired. For example, trioctadecyl borate, tritolyl borate, tricyclopentyl borate and the like borates can be substituted in the above examples to produce similar results.

While it is not essential to employ a solvent in conducting the process of this invention, some advantage is achieved in providing fluidity of the reaction mixture and better contact of the reactants in view of the solid character of the aluminum metal. Likewise, when the borate employed is a solid under reaction conditions or when the by-product is solid under reaction conditions it is preferable to employ a diluent. In general, any organic diluent which is essentially inert in the reaction mixture can be employed. Further general criteria of such diluents are that they be liquid under reaction conditions, have a low boiling point to facilitate removal from the system and preferably exhibit solubility for the borate and aluminum by-product. Included among such diluents are the hydrocarbons, especially alkyl, cycloalkyl, and aromatic, the ethers, tertiary amines or an excess of the borate when it is liquid. Among such diluents are included the hexanes, nonanes, decanes, cyclohexanes, benzene, toluene, dimethyl ether, diethyl ether, diamyl ether, methyl amyl ether, tetrahydrofuran, tetrahydropyran, 1,4-dioxane, tetraethylene glycol dimethyl ether, glycerol trimethyl ether, 1,2,4-trimethoxy benzene, the diethyl, dimethyl, and methyl ethyl ethers of diethylene glycol, trimethyl amine, methyl pyridine, triethyl amine, dimethyl aniline, trioctyl amine, tricyclohexyl amine, tricyclopentyl amine, trioctadecyl amine and the like.

The cyclic ethers, tertiary amines, and aromatic hydrocarbons comprise preferred diluents to be employed. Of these the tertiary amines, especially trialkyl tertiary amines, having up to and including about 6 carbon atoms in each alkyl group are more especially preferred since they will complex with the diborane formed. Such complexes, as obtained, are useful as reducing agents. It is also desirable to employ the tertiary amines since they will complex with the diborane facilitating its removal from the reaction mixture. If desired, diborane can be obtained from such complexes by acidification with an inorganic acid such as hydrochloric acid or boron trichloride at room temperature.

In general a temperature between about 120 to 300° C. is employed for the principal reaction. Below 120° C. the reaction proceeds quite slowly and, likewise, no particular advantage is achieved at temperatures above 300° C. When the reaction is conducted in the absence of a complexing tertiary amine, it is usually conducted at between 130 to 200° C. In this system temperatures above 130° C. provide faster reaction rates but temperatures above 200° C. should be avoided in order to diminish pyrolysis of the diborane. In order to achieve a more selective production of diborane and thereby produce diborane in highest yields in this system, temperatures between 140 to 180° C. are preferred since within this range a fast reaction rate is obtained and essentially no pyrolysis of the diborane and no mixture of boron hydrides is produced. When an amine is employed as a diluent in the reaction mixture thereby resulting in a boron hydride-amine complex, it is preferable to use a temperature between 200 to 250° C. since faster reaction rates are obtained while still obtaining selectivity of formation of the boron hydride-amine complex by virtue of the greater stability of this material.

In general, the reaction is conducted at superatmospheric pressures as between about 500 to 5000 p.s.i.g. For most effective results, pressures above 1000 p.s.i.g. are employed. The reaction time is not critical and generally the reaction is complete within 10 hours. For best results reaction times between 1 to 5 hours are employed.

The proportions of the reactions are generally based upon the amount of borate employed. Although some diborane is produced when the amount of reactants is varied over a wide range, in general between about 1 to 5 moles of aluminum are employed per mole of the borate. An enhancement in yield is obtained when an excess of the aluminum is employed and thus in a preferred embodiment between about 1½ to 3 moles of aluminum per mole of the borate are utilized. Since the hydrogen is gaseous and pressurized into the system a hydrogen atmosphere is generally all that is required, any excess being recoverable and reused. For highest yields, however, at least 3 moles of hydrogen per mole of the borate are pressurized into the reaction system. Any excess hydrogen is readily removed from the diborane by scrubbing. On the other hand when a boron hydride amine complex is formed, being a liquid, the hydrogen is removed by venting and recycling. When employing diluents in the reaction system a sufficient amount is provided in order to obtain fluidity of the reaction mixture. In general between about 1 to 100 parts of diluent per part of borate are employed whereas for most efficient and economical operation between about 2 to 10 parts of diluent per part of borate are desirable.

In order to further enhance the reaction rate, catalysts for the reaction can be employed. For this purpose, trialkyl aluminum or boron compounds, preferably having up to and including about 6 carbon atoms in each alkyl radical, and aluminum halides, particularly the chlorides, are well suited. Such catalysts are especially effective when an alkyl borate is employed as the boron compound. For reaction of aluminum and hydrogen with an alkyl borate, the aryl borates previously described are also useful as catalysts. When employed, the catalysts are preferably present in amount between about 1 to 5 percent by weight of the borate reactant. Thus, the efficiency of Examples II and III above is further enhanced when triethylaluminum, triethylboron, aluminum chloride, or triphenyl borate are added to the reaction mixtures in the aforementioned amounts.

Since one of the constituents of the reaction mixture, namely the aluminum, is a solid it is preferable to employ agitation to provide more intimate contact of the reactants. In general the more vigorous agitation employed the better the reaction proceeds. Accordingly, turbulent agitation of the reaction mixture is preferred.

The mode of addition of the reactants is not critical, that is, the borate can be added to the finely divided aluminum metal or the converse order of addition can be employed.

The principal reaction of the borate with aluminum and hydrogen is well suited to an integrated process whereby the by-product aluminum alcoholate is treated to recover the alcohol value. The following example will illustrate such an integrated process.

*Example X*

Example I is repeated. At the completion of the reaction, the reaction mixture is filtered to remove excess aluminum which is recycled for reaction and then the filtrate is subjected to distillation at room temperature and 10 millimeters of mercury to remove as a first fraction the triethylamine solvent. The temperature of the reaction mixture is then increased to 100° C. wherein the boron hydride-amine complex is distilled. The residue from the distillation operation is then hydrolyzed with water and filtered to collect the phenol as a filtrate. The phenol is then reacted with boric oxide at reflux temperature for several hours to form additional triphenyl borate which is recycled for reaction with additional and recycled aluminum and hydrogen.

Although ordinarily no unreacted borate is present, alternatively the above distillation residue, prior to hydrolysis can be further distilled to recover any unreacted phenyl borate present for reuse.

The above procedure is employed in a similar manner when a non-complexing diluent is used or when no diluent is employed.

Having thus described the process of this invention it is not intended that it be limited except as set forth in the following claims.

We claim:

1. The process for preparing a boron hydride which comprises reacting a hydrocarbon ester of boric acid, wherein each hydrocarbon group contains up to and including about 20 carbon atoms and is selected from the group consisting of alkyl, cycloalkyl, alkenyl, cycloalkenyl, and aryl groups, with aluminum metal and hydrogen.

2. The process for preparing boron hydride-triethylamine complex which comprises reacting triphenyl borate with aluminum and hydrogen in the presence of triethylamine at a temperature between about 120 to 300° C. and a pressure of 500 to 5000 p.s.i.

3. The process for preparing a boron hydride which comprises reacting a triaryl ester of boric acid wherein the aryl groups contain up to and including about 8 carbon atoms with aluminum and hydrogen at a temperature between about 120 to 300° C. and a pressure of 500 to 5000 p.s.i.

4. The process of claim 3 wherein an aluminum halide is employed as a catalyst.

5. The process of claim 3 wherein the reaction is conducted in the presence of a tertiary amine which is liquid under the reaction conditions and is selected from the group consisting of tertiary alkyl amines, tertiary cyclic amines, and tertiary aryl amines wherein each of said alkyl, cyclic, and aryl groups contain up to and including about 18 carbon atoms.

6. The process of claim 3 wherein the reaction is conducted in the presence of a trialkyl amine having up to and including about 6 carbon atoms in each alkyl group.

7. The process of claim 6 in which a catalytic amount of aluminum chloride is present in the reaction mixture.

References Cited in the file of this patent
UNITED STATES PATENTS
3,094,562 Ashby ———————————— June 18, 1963

OTHER REFERENCES

Schlesinger et al.: Journal American Chem. Soc., vol. 75, pages 205–209 (1953).